C. H. BAER.
COLLAPSIBLE RIM FOR VEHICLE TIRES.
APPLICATION FILED APR. 17, 1917.
1,257,781.
Patented Feb. 26, 1918.
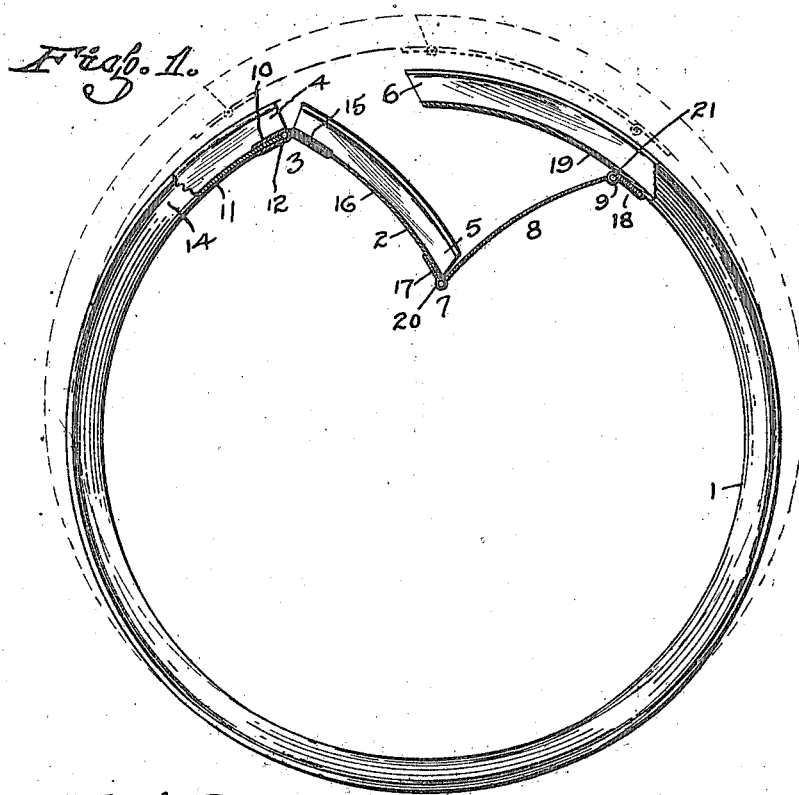
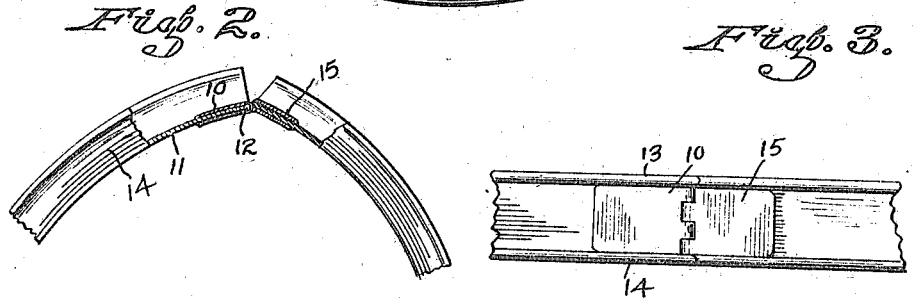
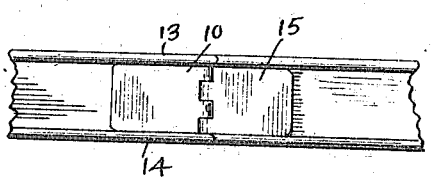
WITNESS:
INVENTOR.
Charles H. Baer
BY
ATTORNEY

UNITED STATES PATENT OFFICE.

CHARLES H. BAER, OF SAN FRANCISCO, CALIFORNIA, ASSIGNOR, BY DIRECT AND MESNE ASSIGNMENTS, OF FIFTY ONE-HUNDREDTHS TO JEAN T. PARKER, TWENTY ONE-HUNDREDTHS TO ARTHUR L. HOLMES, AND TEN ONE-HUNDREDTHS TO SIDNEY WILLIAMS, ALL OF SAN FRANCISCO, CALIFORNIA.

COLLAPSIBLE RIM FOR VEHICLE-TIRES.

1,257,781.  Specification of Letters Patent.  Patented Feb. 26, 1918.

Application filed April 17, 1917. Serial No. 162,793.

*To all whom it may concern:*

Be it known that I, CHARLES H. BAER, a citizen of the United States, and a resident of the city and county of San Francisco, State of California, have invented a certain new and useful Improvement in Collapsible Rims for Vehicle-Tires; and I do hereby declare the following to be a full, clear, concise, and exact description of the same.

The invention relates more particularly to detachable rims for pneumatic automobile tires.

Among the objects of the invention are to reduce the effort in the operation of detaching the rim from the tire to the minimum amount of labor and to save the tire casing from undue violence and wear and tear in the operation.

In this specification and the annexed drawings, the invention is illustrated in the form I consider to be the best, but it is to be understood that the invention is not limited to such form, because it may be embodied in other forms, and it is also to be understood that in and by the claims following the description it is desired to cover the invention in whatever form it may be embodied.

Pneumatic tires are constructed to withstand an internal pressure of 80 pounds or more to the square inch. To prevent circumferential or diametrical enlargement, they are provided with clencher beads, reinforcing cables or other means to prevent breakage at this point. It is necessary that these beads fit snugly into the channel of the supporting rim. Because of the adhesion of the tire or the rusting of the rim, it is very tedious to separate them, except by such means as comprehended in this invention.

In the accompanying one sheet of drawings:

Figure 1 is a side elevation of an automobile tire rim constructed in accordance with this invention and shown in a collapsed condition, the operative position being indicated in dotted lines.

Fig. 2 is a fragmentary detail of the hinge joining the collapsible member to the rim.

Fig. 3 is a plan view from above of the same.

The main section of the rim 1 has a gap therein closed by the collapsible section 2 hinged at 3 to the end 4 of the rim, and closing into contiguous engagement at the respective ends 5 and 6 of the end of the rim and the end of the collapsible segment. The end 5 of the segment is hinged at 7 to the spring toggle section 8 which is hinged at 9 to the rim 1 to control the segment in swinging it into and out of position between the ends 4 and 6. The hinge 9 is spaced back from the end of the rim a distance equal to the length of the toggle section 8. The segment 2 and the lever 8 joined by the hinges 3, 7, and 9, form a toggle when the rim is collapsed as illustrated in Fig. 1, and the section 2 is swung out of circumferential alinement with the rim, the hinge 7 forming the knee of the toggle.

To give the rim the necessary tension to normally collapse and to normally hold it true to circumferential alinement, the section 1 of the rim between the ends 4 and 6 may be curved on a radius slightly less than the normal radius of the expanded rim, illustrated in dotted lines, whereby compression is exerted between the points 3 and 9 of the hinges. This compression tends to collapse the rim in the position shown in Fig. 1; it also tends to hold the rim extended in the position shown in dotted lines, as the knee 7 passes a chord line between the hinges 3 and 9, when the toggle is extended by compression applied at the knee, which separates the ends 4 and 6 to admit the segment 2 therebetween.

A compact and unobtrusive hinge is formed in the structure shown at 3, in which the strap 10 is bent back upon itself to inclose the plate 11 of the rim, to which the strap may be electric spot welded or riveted or attached in the most desirable manner. A pintle pin 12 is set back from the edge of the plate at the end 4, whereby the pintle is confined between the flanges 13 and 14 of the rim, which prevents the dislodgment of the pin after the strap 10 is attached.

The strap 15 is similarly applied to the plate 16 of the segment 2 and is mortised into the strap 10 to engage the pintle pin 12, to form a free acting hinge at the point 3. The hinges at 7 and 9 consist of the lugs 17 and 18 attached to the ends 5 of the segment 2, and to the plate 19 of the rim 1, and are mortised to receive the mortised ends of the toggle lever, to permit common engagement with the pintle pins 20 and 21 respectively.

This invention operates as follows: In the collapsed position illustrated in Fig. 1 the external diameter of the collapsed rim is less than the internal diameter of the tire casing being placed thereon. With the rim in position within the tire casing, pressure exerted on the knee 7 expands the rim section 1 until the segment 2 is forced into position between the ends 4 and 6, the knee 7 having passed the chord line between the hinges 3 and 9, the spring tension in the section 1 tends to hold it in the expanded position. The tire thus mounted is pumped up to the desired air pressure, which pressure exerted inwardly tends to compress the parts 1 and 2 of the rim together which adds further force tending to keep the rim fully expanded. This invention eliminates all the danger of carrying pumped up tires on collapsible rims, as it is impossible to collapse the rim while the knee 7 is beyond the chord line stated.

When it is desired to collapse the rim as shown in Fig. 1, the air pressure must be released from the tire and the toggle collapsed by forcing the knee 7 inwardly beyond the chord line; this can be accomplished by prying the knee 7 inwardly or by a sharp blow inserted inward on the section 2, in which condition the rim can be removed from within the tire, because its external diameter is less than the internal diameter of the tire, as previously described.

Having thus described this invention, what I claim, and desire to secure by Letters Patent is:

1. A collapsible rim including a section having separated ends and curved on a radius less than the radius of the complete rim, a single segment fitting between said ends and hinged at one end to the contiguous rim end, and a toggle lever hinged to the free end of said segment and to said rim section respectively, said segment and said toggle lever being of substantially the same length.

2. A collapsible rim including a section having separated ends curved inwardly, a segment hinged at one end to the contiguous rim section end, and adapted to fit between the section ends when said section is expanded, and a spring toggle lever hinged to the said rim section substantially as disclosed.

In testimony whereof, I have hereunto set my hand at San Francisco, California, this 9th day of April, 1917.

CHARLES H. BAER.

In presence of—
 BALDWIN VALE,
 A. J. HENRY.